US008626553B2

(12) United States Patent
Tengler et al.

(10) Patent No.: US 8,626,553 B2
(45) Date of Patent: Jan. 7, 2014

(54) METHOD FOR UPDATING AN ELECTRONIC CALENDAR IN A VEHICLE

(75) Inventors: Steven C. Tengler, Grosse Pointe Park, MI (US); Steven P. Schwinke, Plymouth, MI (US)

(73) Assignee: General Motors LLC, Detroit, MI (US)

( * ) Notice: Subject to any disclaimer, the term of this patent is extended or adjusted under 35 U.S.C. 154(b) by 306 days.

(21) Appl. No.: 12/847,850

(22) Filed: Jul. 30, 2010

(65) Prior Publication Data

US 2012/0029964 A1 Feb. 2, 2012

(51) Int. Cl.
*G06Q 10/00* (2012.01)

(52) U.S. Cl.
USPC ....... 705/7.19; 705/7.12; 705/7.13; 701/29.1; 701/465

(58) Field of Classification Search
USPC ............... 705/7.11–7.42; 701/29.1–29.3, 465
See application file for complete search history.

(56) References Cited

U.S. PATENT DOCUMENTS

| | | | |
|---|---|---|---|
| 4,748,654 A * | 5/1988 | Gray | 379/40 |
| 6,898,569 B1 | 5/2005 | Bansal et al. | |
| 6,943,671 B2 * | 9/2005 | McGee et al. | 340/384.71 |
| 7,031,724 B2 * | 4/2006 | Ross et al. | 455/456.1 |
| 7,084,758 B1 * | 8/2006 | Cole | 340/539.11 |
| 7,221,937 B2 * | 5/2007 | Lau et al. | 455/419 |
| 7,774,221 B2 * | 8/2010 | Miller et al. | 705/7.19 |
| 7,822,848 B2 * | 10/2010 | Muller et al. | 709/224 |
| 7,920,857 B2 * | 4/2011 | Lau et al. | 455/419 |
| 7,925,525 B2 * | 4/2011 | Chin | 705/7.19 |
| 7,961,087 B2 * | 6/2011 | Hoveida | 340/500 |
| 8,065,362 B2 * | 11/2011 | Greven et al. | 709/203 |
| 8,068,024 B1 * | 11/2011 | Emigh | 340/539.13 |
| 8,069,452 B2 * | 11/2011 | Tse et al. | 719/318 |
| 8,073,614 B2 * | 12/2011 | Coughlin et al. | 701/465 |
| 8,193,932 B1 * | 6/2012 | Emigh | 340/539.13 |
| 2001/0037380 A1 * | 11/2001 | Wall et al. | 709/219 |
| 2002/0107873 A1 * | 8/2002 | Winkler et al. | 707/104.1 |
| 2002/0115453 A1 * | 8/2002 | Poulin et al. | 455/456 |
| 2002/0138306 A1 * | 9/2002 | Sabovich | 705/3 |
| 2002/0191035 A1 * | 12/2002 | Selent | 345/866 |
| 2003/0004747 A1 * | 1/2003 | Burton | 705/1 |
| 2003/0060214 A1 * | 3/2003 | Hendrey et al. | 455/456 |
| 2004/0039504 A1 * | 2/2004 | Coffee et al. | 701/35 |
| 2004/0128067 A1 * | 7/2004 | Smith | 701/207 |
| 2004/0141605 A1 * | 7/2004 | Chen et al. | 379/202.01 |

(Continued)

FOREIGN PATENT DOCUMENTS

CN 1617610 5/2005

OTHER PUBLICATIONS http://en.wikipedia.org/wiki/Telematics.*

*Primary Examiner* — Alan S Miller
(74) *Attorney, Agent, or Firm* — Dierker & Associates, P.C.

(57) ABSTRACT

A method for updating an electronic calendar in a vehicle involves uploading an appointment to the electronic calendar, where the appointment includes a description of an event, a time block for the event, and a travel time preceding the time block. An alert is set in a telematics unit of the vehicle, where the alert notifies a vehicle occupant of the appointment. The alert is configured to be activated in response to a trigger. At a time subsequent to the time block of the event, one of i) a memo is uploaded to the electronic calendar indicating that the alert was activated, or ii) another memo is uploaded to the electronic calendar indicating that the alert was not activated.

19 Claims, 3 Drawing Sheets

(56) References Cited

U.S. PATENT DOCUMENTS

| | | | |
|---|---|---|---|
| 2004/0181433 A1* | 9/2004 | Blair | 705/2 |
| 2004/0203919 A1* | 10/2004 | Ross et al. | 455/456.1 |
| 2005/0027742 A1* | 2/2005 | Eichstaedt et al. | 707/104.1 |
| 2005/0060720 A1* | 3/2005 | Mayer | 719/318 |
| 2005/0141677 A1* | 6/2005 | Hyttinen et al. | 379/50 |
| 2006/0047552 A1* | 3/2006 | Larsen et al. | 705/8 |
| 2006/0271381 A1* | 11/2006 | Pui | 705/1 |
| 2007/0173993 A1* | 7/2007 | Nielsen et al. | 701/35 |
| 2007/0180103 A1* | 8/2007 | Atkins et al. | 709/224 |
| 2008/0013705 A1* | 1/2008 | Yoffie et al. | 379/201.12 |
| 2008/0014908 A1* | 1/2008 | Vasant | 455/414.1 |
| 2008/0039995 A1* | 2/2008 | Reeser | 701/30 |
| 2008/0059228 A1* | 3/2008 | Bossi et al. | 705/2 |
| 2008/0086455 A1* | 4/2008 | Meisels et al. | 707/3 |
| 2008/0140408 A1* | 6/2008 | Basir | 704/260 |
| 2008/0172669 A1* | 7/2008 | McCullough et al. | 718/102 |
| 2009/0033617 A1* | 2/2009 | Lindberg et al. | 345/156 |
| 2009/0094054 A1* | 4/2009 | Perrin et al. | 705/2 |
| 2009/0106036 A1* | 4/2009 | Tamura et al. | 705/1 |
| 2009/0135845 A1* | 5/2009 | Husain et al. | 370/420 |
| 2009/0157615 A1* | 6/2009 | Ross et al. | 707/3 |
| 2009/0254612 A1* | 10/2009 | Mayer | 709/203 |
| 2010/0228473 A1* | 9/2010 | Ranford | 701/204 |
| 2011/0090078 A1* | 4/2011 | Kim et al. | 340/522 |
| 2011/0161432 A1* | 6/2011 | Ellanti | 709/206 |
| 2011/0231091 A1* | 9/2011 | Gourlay et al. | 701/204 |
| 2011/0257881 A1* | 10/2011 | Chen et al. | 701/204 |
| 2011/0301841 A1* | 12/2011 | Schuurbiers et al. | 701/204 |

* cited by examiner

| M, 2010 | | | | | | |
|---|---|---|---|---|---|---|
| M/M | T/D | W/M | T/D | F/F | S/S | S/S |
|  |  |  |  | 1 |  | 2 |
|  |  |  |  |  |  | 3 |
| 4 | 5 | 6 | 7 | 8 |  | 9 |
|  | 9:00 A.M. A  —100 |  | 9:00 A.M. B  11:30 A.M. C —100 |  |  | 10 |
| 11 | 12 | 13 | 14 | 15 |  | 16 |
|  |  |  |  |  |  | 17 |
| 18 | 19 | 20 | 21 | 22 |  | 23 |
|  |  |  |  |  |  | 24 |
| 25 | 26 | 27 | 28 | 29 |  | 30 |
|  |  |  |  |  |  | 31 |

METHOD FOR UPDATING AN ELECTRONIC CALENDAR IN A VEHICLE

TECHNICAL FIELD

The present disclosure relates generally to methods for updating an electronic calendar in a vehicle.

BACKGROUND

Business owners and their employers often use electronic calendars to keep track of scheduled appointments, enabling them to maintain organization of the business. These calendars may be local on a particular electronic device, such as on a personal computer, a laptop notebook, or a netbook, to name a few. In some cases, the electronic calendar may also be synched with other mobile devices such as, e.g., mobile phones, personal digital assistants (PDA's), and/or the like.

SUMMARY

A method for updating an electronic calendar in a vehicle involves uploading an appointment to the electronic calendar, where the appointment includes a description of an event, a time block for the event, and a travel time preceding the time block. An alert is set in a telematics unit of the vehicle, where the alert notifies a vehicle occupant of the appointment. The alert is configured to be activated in response to a trigger. At a time subsequent to the time block of the event, one of i) a memo is uploaded to the electronic calendar indicating that the alert was activated, or ii) another memo is uploaded to the electronic calendar indicating that the alert was not activated.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIG. 2 is a semi-schematic depiction of a page of the electronic calendar;

DETAILED DESCRIPTION

Figure 1:
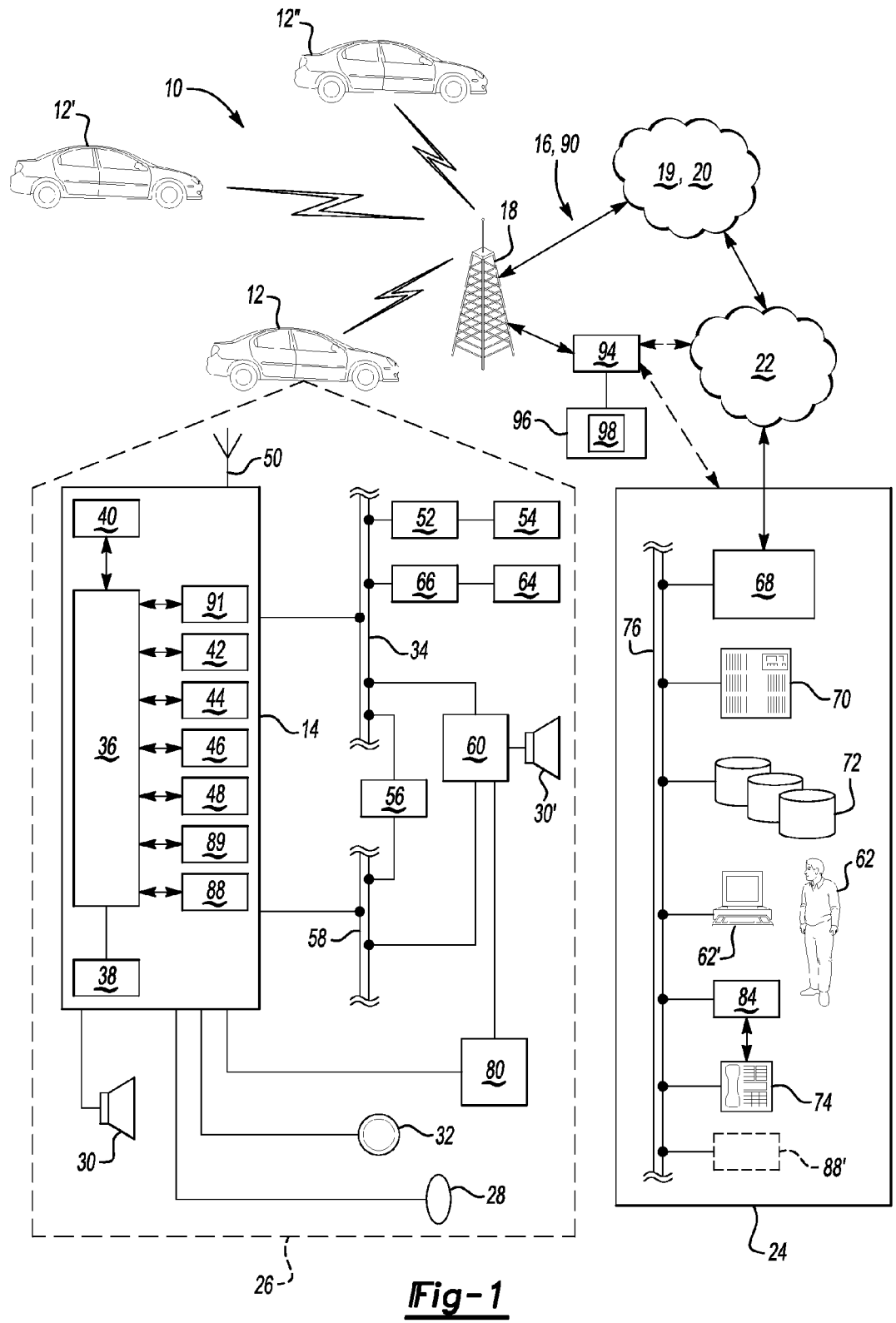
FIG. 1 is a schematic diagram depicting an example of a system for updating an electronic calendar in a vehicle.

Example(s) of the method disclosed herein enable a user to update an electronic calendar in a vehicle. The updated calendar includes one or more scheduled appointments, each having associated therewith pre- and post-event appointment information. The pre-event appointment information includes, for example, information pertaining to a corresponding scheduled appointment. As used herein, a "scheduled appointment" or an "appointment" is a date, a meeting, and/or an event that is arranged for in advance. In a non-limiting example, the pre-event appointment information includes a description of an event for which the appointment was scheduled, a time block for the event (i.e., a known or expected duration of the event), and a travel time preceding the time block (i.e., an anticipated amount of time that it will take to travel to the location at which the event is to occur). The scheduled appointment also has associated therewith an alert that, when triggered, advantageously reminds or otherwise notifies the user of the appointment.

The post-event appointment information includes, for example, information pertaining to what happened after the starting time of the event. The post-event information includes at least one of i) an indication that a reminder alert was activated (which may be interpreted by one reviewing the calendar as a confirmation that the one or more of the vehicle occupants attended the scheduled appointment), or ii) an indication that the reminder alert was not activated (which may be interpreted by one reviewing the calendar as an indication that none of the vehicle occupants attended the scheduled appointment). For example, if the scheduled appointment is a dinner reservation at Restaurant X at 5:00 pm on Friday, and a reminder alert was not triggered, the post-event information uploaded to the calendar may indicate, in some form, that the vehicle occupant(s) did not attend the dinner at Restaurant X at 5:00 pm on Friday or that the vehicle occupant(s) may have attended the dinner at Restaurant X at a later time (e.g., at 5:30 pm).

The pre- and post-event appointment information that is uploaded to the electronic calendar may advantageously be used by an individual as a means for reminding the individual of up-coming appointments. For example, if Mr. X scheduled an appointment to stop at the grocery store on his way home from work on Monday, an alert may be triggered at some point along Mr. X's normal route home reminding him that he needs to stop at the grocery store. If the alert was activated, Mr. X's wife (who has authorized access to Mr. X's calendar) may review post-event information uploaded to the calendar indicating that the alert was triggered and that Mr. X did likely stop at the grocery store on the way home.

The pre- and post-event information may also advantageously be used in a similar manner by a fleet manager, supervisor, owner, or the like for tracking vehicles that are members of a fleet. The fleet manager may, for instance, review the pre- and post-event information uploaded to the electronic calendar of one or more drivers of particular vehicles to determine whether or not the drivers attended one or more of their scheduled appointments. The fleet manager may use the post-event information contained in the electronic calendars of the drivers to promote management and/or organization of the fleet, as well as to determine a habit of one or more drivers that tend to miss or otherwise skip certain scheduled appointments. When a calendar is designated for a specific vehicle rather than a specific driver, the fleet manager can track the vehicle's habits and then can link these habits to one or more drivers.

It is to be understood that, in some examples of the method disclosed herein, the term "user" refers to a vehicle owner, operator, and/or passenger, and such term may be used interchangeably with the term subscriber/service subscriber. In instances where the examples of the method described below involve a single person such as a vehicle owner, operator, or the like, the "user" may be referred to as an individual. It is further to be understood that the term "user" may, in other examples of the method, refer to a manager, supervisor, owner or other authoritative figure in a position to manage or otherwise control a vehicle fleet.

Additionally, the terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween).

Also, the term "communication" is to be construed to include all forms of communication, including direct and indirect communication. As such, indirect communication may include communication between two components with additional component(s) located therebetween.

Referring now to FIG. 1, one non-limiting example of a system 10 for updating an electronic calendar in a vehicle is shown. The system 10 may include a vehicle 12 owned and/or operated by an individual, or may include a plurality of vehicles 12, 12', 12" that are members of a vehicle fleet. Each of the vehicles 12, 12', 12" includes a telematics unit 14. The system 10 further includes a carrier/communication system 16 (including, but not limited to, one or more cell towers 18, one or more base stations 19 and/or mobile switching centers (MSCs) 20, one or more service providers (such as the service provider 90)), one or more land networks 22, and one or more telematics service call/data centers 24.

In an example, the carrier/communication system 16 is a two-way radio frequency communication system, and may be configured with a web service supporting system-to-system communications (e.g., communications between the call center 24 and the service provider 90). The carrier/communication system 16 may also or otherwise be configured with a front-end human-machine interface (HMI, e.g., a webpage) that a user may interact with, for example, to sign up for services, request services, change a service plan, record or enter an alert or prompt, or the like. In this instance, the carrier/communication system 16 would also include a host server 94 including suitable computer equipment (not shown) upon which information of a remotely accessible page 96 (e.g., a webpage, an Internet enabled program, or the like) resides/is stored. Further details of the remotely accessible page 96 will be described below.

The overall architecture, setup and operation, as well as many of the individual components of the system 10 shown in FIG. 1 are generally known in the art. Thus, the following paragraphs provide a brief overview of one example of the system 10. It is to be understood, however, that additional components and/or other systems not shown here could employ the method(s) disclosed herein.

Vehicles 12, 12', 12" are mobile vehicles, such as motorcycles, cars, trucks, recreational vehicles (RV), boats, planes, etc., and are equipped with suitable hardware and software that enables them to communicate (e.g., transmit and/or receive voice and data communications) over the carrier/communication system 16. It is to be understood that the vehicles 12, 12', 12" may also include additional components suitable for use in the telematics unit 14. As mentioned above, the vehicles 12, 12', 12" may be individually owned, or may be owned by a business that uses a number of vehicles (i.e., a vehicle fleet) in operation in their ordinary course of business.

Some of the vehicle hardware 26 is shown generally in FIG. 1, including the telematics unit 14 and other components that are operatively connected to the telematics unit 14. While the vehicle hardware 26 is shown as being operatively disposed in the vehicle 12, it is to be understood that each vehicle 12, 12', 12" has vehicle hardware 26 disposed therein as well. Examples of such other hardware 26 components include a microphone 28, a speaker 30 and buttons, knobs, switches, keyboards, and/or controls 32. Generally, these hardware 26 components enable a user to communicate with the telematics unit 14 and any other system 10 components in communication with the telematics unit 14. It is to be understood that the vehicle 12 may also include additional components suitable for use in, or in connection with, the telematics unit 14.

Operatively coupled to the telematics unit 14 is a network connection or vehicle bus 34. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few. The vehicle bus 34 enables the vehicle 12 to send and receive signals from the telematics unit 14 to various units of equipment and systems both outside the vehicle 12 and within the vehicle 12 to perform various functions, such as unlocking a door, executing personal comfort settings, and/or the like.

The telematics unit 14 is an onboard vehicle dedicated communications device. The telematics unit 14 is linked to both the host server 94 and the call/data center 24. The telematics unit 14 is capable of transmitting data to the host server 94 and is also capable of calling and transmitting data to the call/data center 24.

The telematics unit 14 provides a variety of services, both individually and through its communication with the call/data center 24. The call/data center 24 includes at least one facility that is owned and operated by the telematics service provider. The telematics unit 14 generally includes an electronic processing device 36 operatively coupled to one or more types of electronic memory 38, a cellular chipset/component 40, a wireless modem 42, a navigation unit containing a location detection (e.g., global positioning system (GPS)) chipset/component 44, a real-time clock (RTC) 46, a short-range wireless communication network 48 (e.g., a BLUETOOTH® unit), a dual antenna 50, a recorder 91, a text-to-speech unit 89, and, in some instances, a speech-to-text unit 88. In one example, the wireless modem 42 includes a computer program and/or set of software routines executing within processing device 36.

It is to be understood that the telematics unit 14 may be implemented without one or more of the above listed components, such as, for example, the short-range wireless communication network 48. It is to be further understood that telematics unit 14 may also include additional components and functionality as desired for a particular end use.

The electronic processing device 36 may be a micro controller, a controller, a microprocessor, a host processor, and/or a vehicle communications processor. In another example, electronic processing device 36 may be an application specific integrated circuit (ASIC). Alternatively, electronic processing device 36 may be a processor working in conjunction with a central processing unit (CPU) performing the function of a general-purpose processor. In an example, the processor 36 includes software having computer readable code for activating an alert, which is output to the vehicle occupant(s), in some form, as a reminder or notification of an up-coming appointment scheduled in the electronic calendar 98.

In an example, the alert is a visual alert (such as a flashing light or a text message displayed on an in-vehicle display 80), an audible alert (such as an audible message, a tone, a beep, and/or the like), both a visual and an audible alert, and/or any combination of HMI modalities (e.g., a haptic alert). The purpose of these alerts, upon activation thereof, is to notify the vehicle occupant(s) of an up-coming appointment, whereby details of the upcoming appointment may be retrieved by the vehicle occupant(s) upon accessing the calendar 98 resident on the server 94. Access to the calendar 98 may be accomplished from inside the vehicle 12, e.g., using a mobile device having Internet access capabilities.

As mentioned in one example, the alert may be a text-based message presented on the display 80 associated with the telematics unit 14. This text-based message is referred to herein as a "data alert", and is configured to place the vehicle occupants) on notice of an upcoming appointment and, in some cases, includes some or all of the pre-event appointment information (in the form of text) previously uploaded onto the calendar 98. In an example, upon activating the data alert, the display 80 may output to the vehicle occupant(s), in text form, i) a notification of the appointment, ii) a description of the event, and iii) the duration of the event as scheduled in the calendar 98.

As mentioned in yet another example, the alert may be a voice-based or audible message that is output to the vehicle occupant(s) through the audio component 60. The voice-based message is referred to herein as a "voice alert", and may also include some or all of the pre-event appointment information previously uploaded to the calendar 98. It is to be understood that the voice alert may be set in the telematics unit 14 by converting a data upload of the pre-event appointment information from the calendar 98 resident on the server 94 into an audible form (referred to herein as a voice upload) using the text-to-speech unit 89. In a non-limiting example, the voice alert may include i) a voice notification of the appointment, and ii) at least the event description of the appointment from the voice upload.

The processor 36 may further include software having computer readable code for uploading a memo to the electronic calendar 98 at some predefined time after the scheduled appointment started. In an example, the memo will recite, in some form, that an alert was or was not activated. The memo may, e.g., be automatically generated by the processor 36, and then uploaded onto the calendar 98 using the telematics unit 14 and the wireless communication system 16.

Still referring to FIG. 1, the location detection chipset/component 44 may include a Global Position System (GPS) receiver, a radio triangulation system, a dead reckoning position system, and/or combinations thereof. In particular, a GPS receiver provides accurate time and latitude and longitude coordinates of the vehicle 12 responsive to a GPS broadcast signal received from a GPS satellite constellation (not shown).

The cellular chipset/component 40 may be an analog, digital, dual-mode, dual-band, multi-mode and/or multi-band cellular phone. The cellular chipset-component 40 uses one or more prescribed frequencies in the 800 MHz analog band or in the 800 MHz, 900 MHz, 1900 MHz and higher digital cellular bands. Any suitable protocol may be used, including digital transmission technologies such as TDMA (time division multiple access), CDMA (code division multiple access) and GSM (global system for mobile telecommunications). In some instances, the protocol may be short-range wireless communication technologies, such as BLUETOOTH®, dedicated short-range communications (DSRC), or Wi-Fi.

Also associated with electronic processing device 36 is the previously mentioned real time clock (RTC) 46, which provides accurate date and time information to the telematics unit 14 hardware and software components that may require and/or request such date and time information. In an example, the RTC 46 may provide date and time information periodically, such as, for example, every ten milliseconds.

As mentioned above, the vehicle 12 further includes the speech-to-text unit 88 operatively associated with the telematics unit 14. The speech-to-text unit 88 includes speech recognition software and is in operative communication with a recorder 91 (described below). In one example, when a user wishes to record speech (such as to create or respond to a post-event memo), he/she presses an in-vehicle button to initiate the recorder 91. In response to an in-vehicle prompt that the recorder 91 is recording (e.g., an audible beep or a blinking light), the user speaks, and the recorder 91 records the user's utterance(s). The recorded utterance(s) is/are then transmitted to the speech-to-text unit 88, and the speech recognition software of the unit 88 is configured to convert the recorded utterance(s) into corresponding text. This text may be uploaded from the telematics unit 14 to the electronic calendar 98.

In another example, the recorder 91 is a component of the telematics unit 14, and the speech-to-text unit 88' is located at the call center 24 (as shown in phantom in FIG. 1). In these instances, the user may activate the recorder 91 as previously described, and when the recording is complete, the telematics unit 14 may be configured to initiate communication with the call center 24 to transfer the recording to the off-board speech-to-text unit 88'. A voice channel or packet data may be used to transmit the recorded data. Once the recording is transmitted to the speech-to-text unit 88', the speech recognition software converts the recorded utterance(s) into corresponding text, and the text may be uploaded from the call/data center 24 to the electronic calendar 98.

In an example, the telematics unit 14 also includes a text-to-speech unit 89 that converts the text of, e.g., pre-event information of a calendar appointment into an audible format. The text-to-speech unit 89 utilizes one or more data translation algorithms to translate or otherwise convert digital signals of the text (which is in the form of phonetic data) into an audible, human-understandable form. The audio form of the message may, for example, be played back to the user through speakers 30' of the audio component 60.

The telematics unit 14 provides numerous services alone or in conjunction with the call/data center 24, some of which may not be listed herein, and is configured to fulfill one or more user or subscriber requests. Several examples of such services include, but are not limited to: turn-by-turn directions and other navigation-related services provided in conjunction with the GPS based chipset/component 44; airbag deployment notification and other emergency or roadside assistance-related services provided in connection with various crash and or collision sensor interface modules 52 and sensors 54 located throughout the vehicle 12; and infotainment-related services where music, Web pages, movies, television programs, videogames and/or other content is downloaded by an infotainment center 56 operatively connected to the telematics unit 14 via vehicle bus 34 and audio bus 58. In one non-limiting example, downloaded content is stored (e.g., in memory 38) for current or later playback.

Again, the above-listed services are by no means an exhaustive list of all the capabilities of telematics unit 14, but are simply an illustration of some of the services that the telematics unit 14 is capable of offering. It is to be understood that when such services are obtained from the call/data center 24, the telematics unit 14 is considered to be operating in a telematics service mode.

Vehicle communications generally utilize radio transmissions to establish a voice channel with carrier system 16 such that both voice and data transmissions may be sent and received over the voice channel. Vehicle communications are enabled via the cellular chipset/component 40 for voice communications and the wireless modem 42 for data transmission. In order to enable successful data transmission over the voice channel, wireless modem 42 applies some type of encoding or modulation to convert the digital data so that it can communicate through a vocoder or speech codec incorporated in the cellular chipset/component 40. It is to be understood that any suitable encoding or modulation technique that provides an acceptable data rate and bit error may be used with the examples disclosed herein. Generally, dual mode antenna 50 services the location detection chipset/component 44 and the cellular chipset/component 40.

The microphone 28 provides the user with a means for inputting verbal or other auditory commands, and can be equipped with an embedded voice processing unit utilizing human-machine interface (HMI) technology known in the art. Conversely, speakers 30, 30' provides verbal output to the vehicle occupants and can be either a stand-alone speaker (e.g., speaker 30) specifically dedicated for use with the telematics unit 14 or can be part of a vehicle audio component 60 (e.g., speaker 30'). In either event and as previously mentioned, microphone 28 and speakers 30, 30' enable vehicle hardware 26 and telematics service data/call center 24 to communicate with the occupants through audible speech. The vehicle hardware 26 also includes one or more buttons, knobs, switches, keyboards, and/or controls 32 for enabling a vehicle occupant to activate or engage one or more of the vehicle hardware components. For instance, one of the buttons 32 may be an electronic pushbutton used to initiate voice communication with the telematics service provider data/call center 24 (whether it be a live advisor 62 or an automated call response system 62'), e.g., to request emergency services. In another example, one of the buttons 32 may be used to initiate the recorder 91.

The audio component 60 is operatively connected to the vehicle bus 34 and the audio bus 58. The audio component 60 receives analog information, rendering it as sound, via the audio bus 58. Digital information is received via the vehicle bus 34. The audio component 60 provides AM and FM radio, satellite radio, CD, DVD, multimedia and other like functionality independent of the infotainment center 56. Audio component 60 may contain a speaker system 30', or may utilize speaker 30 via arbitration on vehicle bus 34 and/or audio bus 58.

Still referring to FIG. 1, the vehicle crash and/or collision detection sensor interface 52 is/are operatively connected to the vehicle bus 34. The crash sensors 54 provide information to the telematics unit 14 via the crash and/or collision detection sensor interface 52 regarding the severity of a vehicle collision, such as the angle of impact and the amount of force sustained.

Other vehicle sensors 64, connected to various sensor interface modules 66, are operatively connected to the vehicle bus 34. Example vehicle sensors 64 include, but are not limited to, gyroscopes, accelerometers, magnetometers, emission detection and/or control sensors, environmental detection sensors, and/or the like. Non-limiting example sensor interface modules 66 include powertrain control, climate control, body control, and/or the like.

As mentioned above, the vehicle hardware 26 also includes the display 80. The display 80 may be operatively directly connected to or in communication with the telematics unit 14, or may be part of the audio component 60. Non-limiting examples of the display 80 include a VFD (Vacuum Fluorescent Display), an LED (Light Emitting Diode) display, a driver information center display, a radio display, an arbitrary text device, a heads-up display (HUD), an LCD (Liquid Crystal Diode) display, and/or the like.

The electronic memory 38 of the telematics unit 14 may be configured to store data associated with the various systems of the vehicle 12, vehicle operations, vehicle user preferences and/or personal information, and the like.

A portion of the carrier/communication system 16 may be a cellular telephone system or any other suitable wireless system that transmits signals between the vehicle hardware 26 and land network 22. According to an example, the wireless portion of the carrier/communication system 16 includes one or more cell towers 18, base stations 19 and/or mobile switching centers (MSCs) 20, as well as any other networking components required to connect the wireless portion of the system 16 with land network 22. It is to be understood that various cell tower/base station/MSC arrangements are possible and could be used with the wireless portion of the system 16. For example, a base station 19 and a cell tower 18 may be co-located at the same site or they could be remotely located, and a single base station 19 may be coupled to various cell towers 18 or various base stations 19 could be coupled with a single MSC 20. A speech codec or vocoder may also be incorporated in one or more of the base stations 19, but depending on the particular architecture of the wireless network 16, it could be incorporated within an MSC 20 or some other network components as well.

Land network 22 may be a conventional land-based telecommunications network that is connected to one or more landline telephones and connects the wireless portion of the carrier/communication network 16 to the call/data center 24. For example, land network 22 may include a public switched telephone network (PSTN) and/or an Internet protocol (IP) network. It is to be understood that one or more segments of the land network 22 may be implemented in the form of a standard wired network, a fiber or other optical network, a cable network, other wireless networks such as wireless local networks (WLANs) or networks providing broadband wireless access (BWA), or any combination thereof.

The call/data center 24 of the telematics service provider is designed to provide the vehicle hardware 26 with a number of different system back-end functions. According to the example shown in FIG. 1, the call/data center 24 generally includes one or more switches 68, servers 70, databases 72, live and/or automated advisors 62, 62', processing equipment (or processor) 84, as well as a variety of other telecommunication and computer equipment 74 that is known to those skilled in the art. The call/data center 24 may also include the speech-to-text unit 88' as mentioned above. These various telematics service provider components are coupled to one another via a network connection or bus 76, such as one similar to the vehicle bus 34 previously described in connection with the vehicle hardware 26.

The processor 84, which is often used in conjunction with the computer equipment 74, is generally equipped with suitable software and/or programs enabling the processor 84 to accomplish a variety of call/data center 24 functions. The various operations of the call/data center 24 are carried out by one or more computers (e.g., computer equipment 74) programmed to carry out some of the tasks of the method(s) disclosed herein. The computer equipment 74 (including computers) may include a network of servers (including server 70) coupled to both locally stored and remote databases (e.g., database 72) of any information processed.

Switch 68, which may be a private branch exchange (PBX) switch, routes incoming signals so that voice transmissions are usually sent to either the live advisor 62 or the automated response system 62', and data transmissions are passed on to a modem or other piece of equipment (not shown) for demodulation and further signal processing. The modem preferably includes an encoder, as previously explained, and can be connected to various devices, such as the server 70 and database 72.

It is to be appreciated that the call/data center 24 may be any central or remote facility, manned or unmanned, mobile or fixed, to or from which it is desirable to exchange voice and data communications. As such, the live advisor 62 may be physically present at the call/data center 24 or may be located remote from the call/data center 24 while communicating therethrough.

The communications network provider 90 generally owns and/or operates the carrier/communication system 16. In an example, the communications network provider 90 is a cellular/wireless service provider (such as, for example, VERIZON WIRELESS®, AT&T®, SPRINT®, etc.). It is to be understood that, although the communications network provider 90 may have back-end equipment, employees, etc. located at the telematics service provider data/call center 24, the telematics service provider is a separate and distinct entity from the network provider 90. In an example, the equipment, employees, etc. of the communications network provider 90 are located remote from the data/call center 24. The communications network provider 90 provides the user with telephone and/or Internet services, while the telematics service provider provides a variety of telematics-related services (such as, for example, those discussed hereinabove). It is to be understood that the communications network provider 90 may interact with the data/call center 24 to provide services to the user.

While not shown in FIG. 1, it is to be understood that in some instances, the telematics service provider operates the data center 24, which receives voice or data calls, analyzes the request associated with the voice or data call, and transfers the call to an application specific call center (not shown). It is to be understood that the application specific call center may include all of the components of the data center 24, but is a dedicated facility for addressing specific requests, needs, etc. Examples of the application specific call centers include emergency services call centers, navigation route call centers, in-vehicle function call centers, or the like.

The remotely accessible page 96 is a webpage set up and maintained by the communications network provider 90 or by a call center 24, and the user may access the page 96 by, e.g., submitting an appropriate login and password. In an example, the remotely accessible page 96 enables a user or another authorized person to access the electronic calendar 98 for scheduling appointments, uploading pre-event appointment information associated with the appointments, and/or to view post-event appointment information of one or more past appointments. As will be described in further detail below, the user (such as an individual vehicle owner, a fleet manager and/or owner, etc.) signs up to utilize the remotely accessible page 96 to access/manage the electronic calendar 98. Upon registering, the user is given an initial password and login ID, both of which may be customized by the user after the initial registration process is complete. An account is set up for the user, which may include a name and/or company name associated with the account, contact information, billing information, etc. The subscriber can enroll via one of several methods. As one example, the subscriber can enroll through a website associated with the remotely accessible page 96, which may or may not be part of a more comprehensive website associated with the call/data center 24. Another example involves placing a voice call to the call/data center 24, and speaking with an advisor 62. The advisor 62 may enroll the user through computer access to the subscriber's account information.

In an example, the remotely accessible page 96 may include a homepage (not shown) including enrollment boxes, and login and ID boxes that enable the user (or the advisor 62) to access his/her account. The homepage may also include convenient drop-down options for the user for easy access to the user's electronic calendar 98. The remotely accessible page 96 may be available 24 hours per day and 7 days per week, which allows the user flexibility with updating his/her calendar 98 and a manager flexibility with tracking employee's calendars 98.

When a fleet manager, owner, supervisor, or the like signs up, he/she registers all of the vehicles in the fleet (such as the vehicles 12, 12', 12" as shown in FIG. 1). In an example, registering the vehicles 12, 12', 12" includes inputting vehicle ID numbers, the make and model of each vehicle 12, 12', 12", the region in which a respective vehicle 12, 12', 12" will be used, etc. In an example, the fleet owner may also register other users that are authorized to access the account (including the other users' names, ID numbers, etc.), as well as designate any desirable parameters for the calendar 98. For example, one calendar 98 may be set up for an entire fleet and/or one calendar may be associated with each driver in the fleet and/or one calendar may be associated with a particular fleet vehicle 12, 12', 12" (regardless of who the driver is). As one example, the fleet owner may assign each member of his/her team a login and password so that each member can assess his/her individual calendar 98 without accessing another's calendar 98 or general account information. Each member of the fleet may then access his/her calendar 98 from one or more electronic devices (such as, e.g., a personal computer, a netbook, a laptop notebook, a mobile phone, a personal digital assistant, and/or the like). As another example, the fleet owner may assign each vehicle 12, 12', 12" a calendar 98, and each member of his/her team a login and password so that each member can assess the vehicle calendars 98. Each member of the fleet may access the calendars 98 from one or more electronic devices to determine which vehicle 12, 12', 12" he/she is assigned to on a particular day.

The call/data center 24 may also be given access to the calendar(s) 98 once the user (e.g., the individual, fleet owner, etc.) has i) subscribed for services associated with the call/data center 24, and ii) has agreed that the call/data center 24 may have access. As an example, when a fleet owner signs up a plurality of vehicles (e.g., vehicles 12, 12', 12") for telematics related services through the call/data center 24, each vehicle user in his/her fleet will have access to his/her own calendar 98 on the remotely accessible page 96, and will be able to utilize one or more call/data centers 24 associated with the telematics related services. Furthermore, in this example, once the fleet account is set up with the call/data center 24, the fleet owner can enable the call/data center(s) 24 to transmit data to each electronic calendar 98 that is registered with the fleet owner's particular account.

Referring briefly to FIG. 2, each individual who has subscribed to the remotely accessible page 96 has access to his/her online calendar 98. The calendar 98 may be used to keep track of appointments A, B, and C (as shown in FIG. 2), examples of which include personal appointments, sales calls, client meetings, etc. As shown in FIG. 2, appointments (e.g., a client meeting A at 9:00 am on Tuesday (T/D, which stands for Tuesday/Dienstag (Tuesday in German)) the $5^{th}$; a sales meeting B at 9:00 am on Thursday (T/D, which stands for Thursday/Donnerstag (Thursday in German)) the $7^{th}$; and a lunch meeting at 11:30 am on Thursday (T/D) the $7^{th}$) have been logged into appropriate cells 100 of the calendar 98 via any computer or electronic device capable of supporting and running the remotely accessible page 96. As shown in FIG. 2, the appointments A, B, and C may be shown on a monthly basis (e.g., month "M" of year 2010). However, it is to be understood that yearly, weekly, and daily calendar pages may also be accessed/viewed. While the calendar is shown to represent English and German languages, the language used may be any language supported by the program running the electronic calendar 98.

It is to be understood that the calendar 98 is created/managed/updated by a user accessing the webpage 96 (as mentioned above). The calendar 98 may also be updated when a memo (indicative of the activation or non-activation of an alert) is uploaded from the telematics unit 14 or the call center processor 84. The calendar 98 and its associated information is stored in and is resident in the server 94. The data entered into the calendar 98 may, in some instances, also be stored in the database 72 at the call/data center 24, and is linked to the user's profile.

Examples of the method for updating an electronic calendar 98 will be described hereinbelow in conjunction with FIGS. 1-4. In one example, the electronic calendar 98 of an individual (such as a vehicle owner) is updated. In this example, the individual is registered so that he/she can access and utilize the electronic calendar 98 through the webpage 96, as described herein. For instance, the individual accesses his/her account by submitting an acceptable login and password on a homepage of the webpage 96, which allows the individual to gain access to his/her electronic calendar 98 stored on the server 94. Upon accessing the calendar 98, the individual may update the calendar 98, e.g., by removing currently-existing appointments from the calendar 98, adding or scheduling new appointments to the calendar 98, and/or changing one or more terms associated with pre-event appointment information pertaining to a particular pre-existing appointment.

In an example, the individual may remove a calendar appointment by selecting the appropriate appointment cell 100, and deleting the appointment. Deleting may be accomplished, e.g., by selecting a delete function from a menu, pressing a delete key on a keyboard, or via any function provided within the HMI of the calendar 98. When the appointment is removed, all of the terms associated with the appointment are removed, including the pre-event appointment information, trigger(s) for activating a reminder alert, personal preferences, etc.

When a new calendar appointment is scheduled, the individual will select to create a new appointment via, e.g., a mouse click on an appropriate icon or menu choice, and will then input (as a data upload) all of the pre-event appointment information (e.g., event description, duration, etc.) pertaining to the new appointment. If, for example, the individual wishes to make a calendar appointment for a lunch date with an associate at 12:00 pm at Restaurant Z on Wednesday the 13$^{th}$, he/she may, e.g., select to create a new appointment by clicking on the appropriate icon, e.g., which directs the individual to a new screen designed to create new appointments. The individual may then input a general description of the event (in this case, lunch with the associate at Restaurant Z), the time block for the event (e.g., from 12:00 pm until 1:30 pm), and a travel time preceding the time block (e.g., if it takes about 20 minutes to travel from the individual's location prior to the event (e.g., his/her place of business or residence) to the location of Restaurant Z, then the individual may input a travel time from 11:40 am to 12:00 pm). The pre-event information may be input by typing the information into appropriate input boxes displayed on the webpage 96 (such as, e.g., the description of the event), and/or by selecting options from a drop down menu (such as, e.g., the time block for the event). The individual may thereafter select a "SUBMIT", "DONE", "SAVE AND CLOSE" or other similar button, icon, or menu choice when he/she is finished creating the appointment.

In instances where the individual wishes to change or edit an existing calendar appointment, he/she may access the existing appointment (via, e.g., a mouse click on the appropriate appointment cell 100 displayed on the electronic calendar 98 shown in FIG. 2) and select the input boxes that he/she wishes to change/edit. If, for example, the lunch date for Restaurant Z was changed to Restaurant Y, the individual may click on the appointment, the event description input box, and then edit the event description to recite something similar to "Lunch date at Restaurant Y". Upon accepting the change (which may be accomplished, e.g., by a mouse click on the "DONE" or "SUBMIT" button as mentioned above), the edited event description is uploaded to the electronic calendar 98 and saved therein.

Removing, scheduling, or editing an appointment may also be accomplished by placing a voice call to the call/data center 24, and submitting a request to remove, schedule, or edit an appointment during the voice call. In this case, the voice call may be received at the switch 68, which routes the call to an appropriate division of the data/call center 24. In instances where the call/data center 24 is a data center, then the switch 68 may route the call to an appropriate application specific call center. In any event, the advisor 62 associated with the appropriate division (or call center) will authenticate the caller (e.g., by having the caller correctly answer one or more challenge questions), and will then update the calendar 98 according to the caller's request. For instance, the advisor 62 may access the individual's electronic calendar 98 via the webpage 96, and perform the updating using the webpage 96 as described above.

The webpage 96 may also be used (directly by the individual or by the call/data center 24) to designate an alert for one or more of the calendar 98 appointments. The alert may be a pre-selected visual or audio alert that is output within the vehicle 12, 12', 12" upon recognition of a trigger associated with the alert. The individual may also select the trigger(s) that is/are to be associated with a particular appointment and to instruct the telematics unit to actuate the alert. As used herein, the term "trigger" refers to an incident that, upon occurrence thereof, prompts the telematics unit 14 to activate the alert. Triggers may be set by the individual user via the webpage 96 (and thus can be altered or revised), or may be set by a fleet owner/manager via the webpage 96 and may not be overridden by an individual driver. Once a trigger is set, it is sent to the telematics unit 14 that is linked to the calendar 98. When the calendar 98 is associated with a particular user, the trigger can be sent to any vehicle telematics unit 14 that is located in a vehicle 12 identified in the user's profile. When the calendar 98 is associated with multiple users but a single vehicle 12, the trigger can be sent to the telematics unit 14 of the single vehicle 12. The trigger(s) can be sent at any time that the telematics unit 14 of the identified vehicle 12 is in an ON state. The webpage 96 or the call/data center 24 if managing the webpage 96 will automatically ping the vehicle 12 to transmit the trigger (in the form of packet data) to the telematics unit 14 for storage therein.

The triggers may be associated with a time of a particular appointment and/or may be associated with a position of the vehicle 12, 12', 12". The individual or fleet owner/manager may designate a time that occurs prior to the event/appointment time as the trigger. More particularly, the trigger may be the recognition that the then-current time is 15 minutes, 30 minutes, 1 hour, etc. prior to the start of an event/appointment stored in the calendar 98. For example, if the scheduled appointment is at 11:00 am and the trigger is 30 minutes prior to the start of the appointment, at 10:30, the telematics unit 14 (if in an ON state) will recognize the set trigger and will activate the alert about the appointment within the vehicle 12, 12', and/or 12". In another example, the time-based trigger may be set to "X" number of minutes before the vehicle's arrival to a particular destination. "X" would be set when the trigger is set, and would be estimated during travel via downloaded directions with estimated travel times.

The individual or fleet owner/manager may designate a predefined geographic boundary (identified by reference numeral 120 in FIG. 3) as the trigger. More particularly, the trigger may be the recognition that the then-current vehicle 12, 12', 12" position coincides with or falls within the set geographic boundary 120. For example, when the vehicle 12, 12', 12" enters the set geographic boundary, the telematics unit 14 will recognize the set trigger and will activate the alert associated with the trigger within the vehicle 12, 12', and/or 12".

Figure 3:
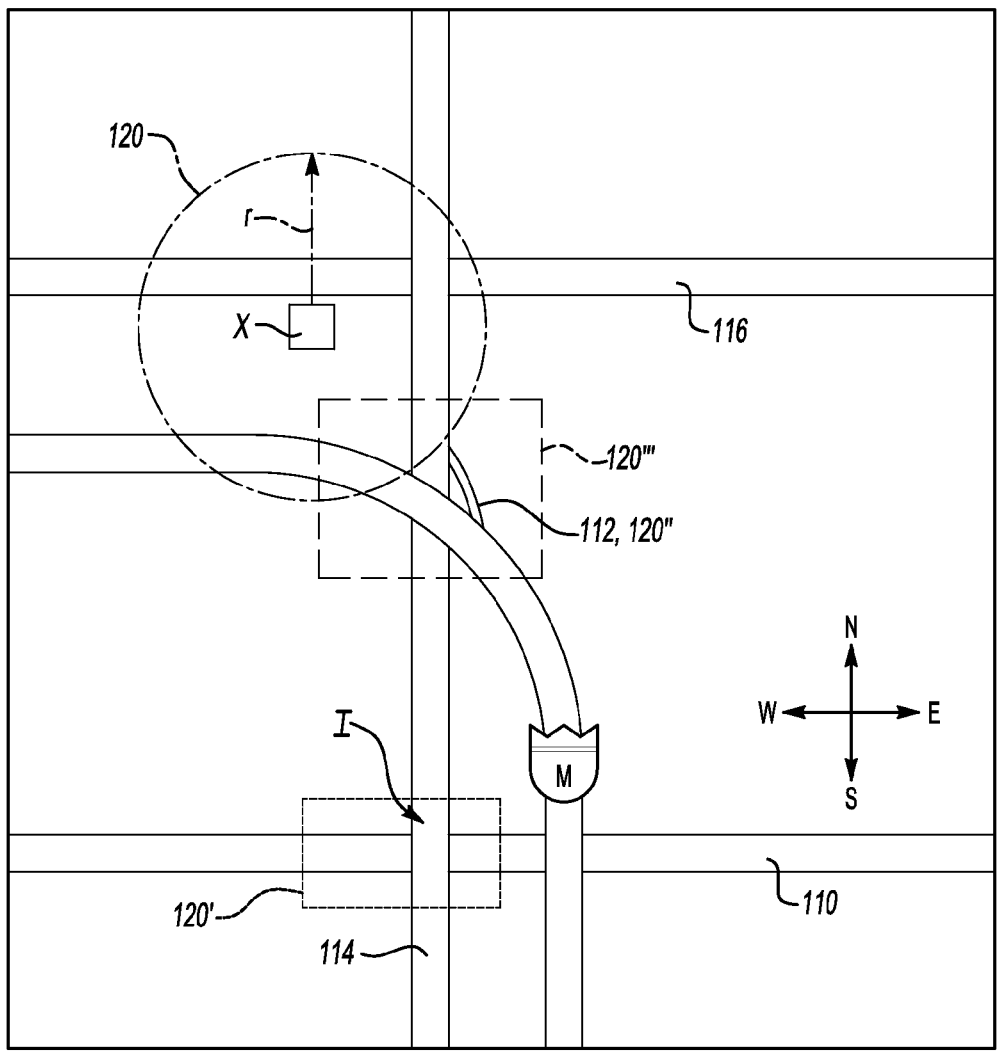
FIG. 3 is a semi-schematic depiction of a road map including at least one geographic boundary.

FIG. 3 schematically illustrates multiple examples of the geographic boundary 120, 120', 120", 120'". In one example, the geographic boundary 120 is constructed around a location at which the event described in the calendar appointment is to occur, and the alert is automatically activated when the vehicle 12, 12', 12" enters the geographic boundary 120. If, for example, the electronic calendar 98 includes an appointment for a lunch date at Restaurant X (identified by reference character "X" in FIG. 3), the geographic boundary 120 may, for instance, be defined by a circular (or other geometric) boundary with X as the center point and a predefined radius "r". This type of geographic boundary 120 may be desirable when the route to be taken may not be known in advance.

In another example, the geographic boundary 120' is defined by all or a portion of a road segment 114 or an intersection I near the location of Restaurant X. In the example shown in FIG. 3, if the vehicle 12, 12', 12" turns onto the road segment 114 off of road segment 110, the vehicle 12, 12', 12" is within the geographic boundary 120', and the alert will be automatically activated by the telematics unit 14. This type of geographic boundary 120' may be desirable when the route to be taken is known in advance. While the intersection I is used as the geographic boundary 120' in this example, it is to be understood that any road segment and/or intersection (for example, the intersection of segments 114 and 116) may be used as the geographic boundary 120'.

In another example, the geographic boundary 120" may be defined by an exit ramp off of a highway or other major road segment, such as highway M shown in FIG. 3. In this example, the telematics unit 14 may activate the alert if it recognizes that the vehicle 12, 12', 12" has taken a particular exit ramp off of highway M, such as ramp 112.

In still another example, the geographic boundary 120'" may be defined as a border constructed around any predefined geographic area or region. As previously mentioned above, this type of geographic boundary 120 may be constructed around the location at which the event is to occur (such as Restaurant X). In other instances however, such as shown in FIG. 3, the geographic boundary 120'" is constructed around a predefined geographic area or region along a most probable route toward the location at which the event is to occur. For instance, if the lunch date at Restaurant X is to occur on a Tuesday, the geographic boundary 120'" may be constructed around an area along a route that the individual will most likely take from his/her workplace to Restaurant X. In the example shown in FIG. 3, the individual may, for instance, be most likely to take highway M northbound, and then exit off highway M at exit 112 toward road segment 114. As soon as the vehicle 12 enters the geographic boundary 120'", the telematics unit 14 will automatically activate the alert.

While numerous examples of the geographic boundary 120, 120', 120", 120'" are shown in FIG. 3, it is to be understood that any desirable geographic boundary may be designated as the trigger and may encompass any desirable mileage, intersection(s), road segment(s), exit(s), landmark(s), etc.

In any of these examples, the telematics unit 14 is aware of the fact that the vehicle 12, 12', 12" is located within the preset geographic boundary 120, 120', 120", 120'" by comparing GPS coordinate data taken from the GPS component 44 with the GPS coordinate data defining the geographic boundary 120, 120', 120", 120'". If a match is found between the compared coordinates (i.e., the GPS coordinate data of the vehicle 12, 12', 12" falls within that defined by the geographic boundary 120), the telematics unit 14 determines that the vehicle 12, 12', 12" has in fact entered the geographic boundary 120, 120', 120", 120'". The comparison between the GPS coordinate data of the vehicle 12, 12', 12" and that of the geographic boundary 120, 120', 120", 120'" may, for example, be continuously run in the background of the telematics unit 14 as soon as the vehicle telematics unit 14 is in an ON state, the ignition is in an ON state, or the vehicle transmission system is shifted into a drive mode. In another example, the comparison run by the telematics unit 14 is initiated within a predefined amount of time prior to a scheduled appointment, and is continuously run until a predefined amount of time after scheduled appointment or upon detecting a trigger. For instance, if a scheduled appointment is at 5:00 pm, the telematics unit 14 may be preset to start running the comparison a half an hour ahead of the 5:00 pm appointment time (i.e., at 4:30 pm), and continue to run the comparison until i) a trigger is detected (e.g., the vehicle 12, 12', 12" entered a predefined geographic boundary 120, 120', 120", 120'" as described above) or until a half hour after the appointment time (i.e., at 5:30 pm).

Referring back to the discussion about appropriate triggers, in still another example, the individual or fleet owner/manager may designate both a time that occurs prior to the event/appointment time and a predefined geographic boundary 120 as triggers. In this example, the trigger is the recognition that the then-current vehicle 12, 12', 12" position coincides with or falls within the set geographic boundary 120 and/or the preset time period before the start of the event/appointment. For example, if the scheduled appointment is at 11:00 am and the triggers include both i) within 30 minutes prior to the start of the appointment and ii) a geographic boundary of 10 miles from the location of the appointment, the telematics unit 14 (if in an ON state) will recognize the set triggers (and activate the alert) when at least one of the two alert-triggering events take place. In one example when the first trigger is detected, the telematics unit 14 will automatically generate the alert, and thereafter will call the call/data center 24 to report that the alert was generated. Upon receiving the call, the call/data center 24 may, in some instances, elect to delete the second trigger.

Figure 4:
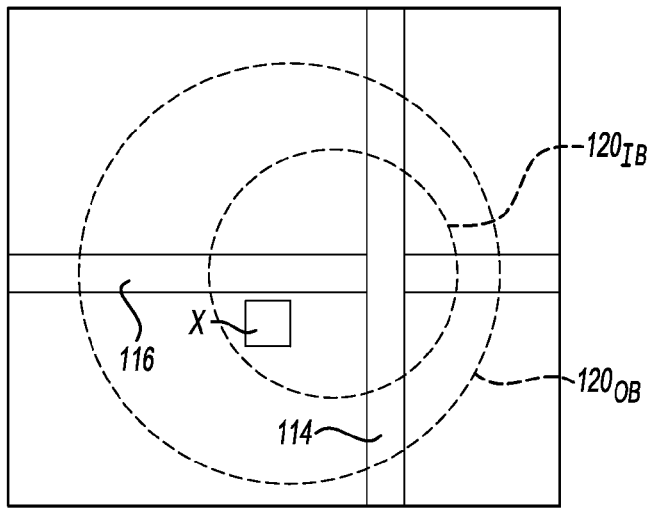
FIG. 4 is a semi-schematic depiction of a road map including inner and outer geographic boundaries.

In yet another example, multiple triggers may be embodied in nested geographic boundaries; i.e., one or more geographic boundaries within an outer geographic boundary. An example of nested geographic boundaries (i.e., an outer geographic boundary $120_{OB}$ and an inner geographic boundary $120_{IB}$) is depicted in FIG. 4. For instance, a first trigger may be detected when the vehicle 12, 12', 12" enters the outer geographic boundary $120_{OB}$, and then a second alert may be generated when the vehicle 12, 12', 12" enters the inner geographic boundary $120_{IB}$. Details of example alerts are provided hereinbelow, however for purposes of illustrating the instant example, alerts are also now described. In instances where the alerts are data alerts or voice alerts, the first and second alerts output to the user on the display 80 (for data alerts) or through the audio component 60 (for voice alerts) may, in some cases, include the same message (e.g., "Sales call with Client A at 12:00 pm", etc.). In other cases, the first and second alerts may include different messages, whereby the first alert that is generated when the vehicle 12, 12', 12" enters the outer boundary $120_{OB}$ may have a primary message associated therewith, and the second alert that is generated when the vehicle 12, 12', 12" enters the inner boundary $120_{IB}$ may have a secondary message associated therewith. For instance, the primary message may be, e.g., "Sales call with Client A at 12:00 pm", and the secondary message may be, e.g., "Don't forget to wish Client A happy birthday."

Upon updating the calendar 98 (by deleting an appointment, creating a new appointment, changing an appointment, selecting an alarm, setting a trigger, etc.), the calendar 98 is automatically stored at the host server 94 of the webpage 96, and the associated triggers are automatically modified in the respective vehicle(s) 12, 12', 12". In a non-limiting example, the triggers are modified by replacing a currently-existing trigger(s) stored in the telematics unit 14 with the new trigger (s) associated with the updated calendar 98. In this example, the currently-existing trigger(s) is/are deleted, and the new trigger(s) is/are stored in the telematics unit 14. In another non-limiting example, the triggers are modified by adding the new trigger(s) to the currently-existing trigger(s) stored in the telematics unit 14. In this example, the new trigger(s) may include the same message/reminder and geographic boundary, for example, as the other trigger(s), however the new trigger(s) may be associated with an extended expiration time or some other feature that adds on to the original trigger.

When a trigger is recognized, the visual or audio alert is generated within the vehicle 12, 12', 12" to inform the in-vehicle user of the upcoming appointment. The alert may be a pre-set alert, or it may be generated in real time. A pre-set alert (e.g., a simple text message or voice message identifying the appointment details) may be selected using the webpage 96, and will be sent to the telematics unit memory 38 for storage therein. When the trigger is recognized, this pre-saved message will be output within the vehicle 12, 12', 12". After the pre-saved message is played, it may be saved (e.g., in a message inbox or the like associated with the calendar 98) at least for a predetermined amount of time after the message is played so that the user may replay the message at a later time if desired.

In some instances when a trigger is recognized, a data call may be initiated from the telematics unit 14 to the call/data center 24. The switch 68 at the call/data center 24 routes the data call to an appropriate advisor 62, 62', who/which can retrieve calendar 98 information from the host server 94 and transmit the information to the vehicle 12. In this example, transmission of the information is accomplished by downloading the information directly to the telematics unit 14. Transmission of the information to the vehicle 12 may also be accomplished via a voice call. For instance, a fleet manager/owner may recite a voice alert to the vehicle 12 driver in real time or a pre-recorded alert may be triggered as the vehicle 12 approaches a destination at which the scheduled appointment is to take place. This voice alert may, e.g., be a command to "speak to an advisor" in instances where the fleet manager/owner may want to provide certain instructions to the vehicle 12 driver such as, e.g., complex delivery instructions/requirements that requires two-way verbal interaction (such as active participation by the vehicle 12 driver in response to various requirements of the delivery).

In another example, the telematics unit call 14 is ultimately patched through to the host server 94 (by the advisor 62, 62') so that the telematics unit 14 can retrieve pre-event appointment information to be included in the alert. More specifically, the desktop application of the advisor 62, 62' may be used to access the user profile to retrieve information pertaining to the vehicle 12, 12', 12" and/or the vehicle owner/subscriber, and this information may be attached to the data call that is forwarded to the host server 94 so that the host server 94 knows which calendar information to retrieve. In this example, the call from the telematics unit 14 may be placed as soon as the telematics unit 14 recognizes one of the triggers described above. In response to the call, the call center 24 transmits, to the telematics unit 14, a text form of the pre-event information for the appointment associated with the recognized trigger. The telematics unit 14 utilizes the pre-event information to formulate an alert (such as a data alert to be presented on the display 80 or a voice alert to be output through the audio component 60) designed to notify the vehicle occupant(s) of the upcoming appointment. This example may be used by fleet vehicles 12 where delivery instructions change prior to arrival at the appointment destination. In these cases, the fleet manager/owner may request that the alert(s) stored at the host server 94 is/are associated with an easily updatable message.

In instances where a data alert is formulated in real time, the vehicle bus 34 of the telematics unit 14 receives the information from the host server 94 or call center 24, and transmits the information to the display 80 for viewing by the in-vehicle occupant(s).

In instances where a voice alert is formulated in real time, the telematics unit 14 uses the text-to-speech unit 89 to convert the received text into an audible, human-recognizable form, and then constructs the alert so that it relays a notification to the vehicle occupant(s) of an upcoming appointment including at least some of the pre-event information. The voice alert may be something similar to "Lunch with Bob at Restaurant X", "Stop at grocery store", "Sales meeting with client A, 9:00 AM", etc. It is to be understood that if the trigger associated with the appointment is based upon time, the voice alert (or data alert) may be output to the vehicle occupant(s) at a predetermined amount of time prior to the starting time of the event, which often falls within a designated travel time.

As mentioned above, the outputting of the voice alert to the vehicle occupant(s) may be accomplished, for example, using the audio component 60 disposed in the vehicle 12. In instances where the audio component 60 is turned off at the time the alert is generated, the telematics unit 14 will activate the audio component 60 so that the voice alert may be played to the vehicle occupant(s). In instances where the audio component 60 is turned on at the time the alert is generated (e.g., the vehicle occupant(s) is/are listening to a radio station, music stored on a compact disc, a podcast stored on an MP3 player, etc.), the telematics unit 14 will momentarily override the output of the audio component 60 so that the voice alert may be played to the vehicle occupant(s).

When the trigger is generated and the alert is activated, the telematics unit 14 automatically initiates a vehicle data upload event (via a vehicle data upload (VDU) system not shown in FIG. 1) for uploading a memo to the electronic calendar 98 resident at the host server 94. The memo may, in an example, be generated by the telematics unit 14 using a preset protocol, and the memo itself may conform to a preset template. The template may include, e.g., that the alert was played at xx:xx, otherwise indicating that the alert was activated. The memo generated by the telematics unit 14 is stored in the calendar 98 as post-event appointment information.

Upon storing the memo in the calendar 98, a response message may be automatically transmitted back to the telematics unit 14 from the host server 94 to remove the trigger from the vehicle 12.

When a trigger is not recognized, an alert is not generated or output within the vehicle 12, 12', 12". As one example, when the telematics unit 14 is not in an ON state during the preset time interval before the start of an appointment, the time trigger will not be recognized and the alert will not be generated. As another example, when the vehicle 12 does not enter the geographic boundary 120 within a designated time interval (such as during the travel time period or within a predetermined amount of time during the time block of the event), activation of the alert by the telematics unit 14 will not be triggered. When the trigger is not activated and is associated with a particular time that has expired, the telematics unit 14 may, for example, disable or delete the trigger so that the associated alert cannot be activated. Whenever a preset trigger is not recognized, the telematics unit 14 automatically initiates a vehicle data upload event for uploading another memo to the electronic calendar 98 that is resident on the webpage 96. This other memo indicates that the trigger was not recognized and thus the associated alert was not activated, and, in some instances, also indicates that the trigger has been disabled or deleted.

In instances where the vehicle 12, 12', 12" is a member of a fleet, the telematics unit 14 may also automatically initiate a message (such as a text message, a voice message, an e-mail message, etc.) that may be transmitted directly to the fleet manager (e.g., to the fleet manager's cellular phone, personal digital assistance, personal computer, or other suitable device) indicating that the alert was activated or not activated.

Once the memo indicating that the alert has been activated or the other memo indicating that the alert has not been activated has been uploaded to the electronic calendar 98, the individual or another person authorized to access the calendar 98 may view the memo/other memo. Viewing may be desirable, for example, by a fleet manager to see whether a particular driver or vehicle 12, 12', 12" associated with the calendar has attended all of its scheduled appointments. In instances where a driver or vehicle 12, 12', 12" has missed one or more of the appointments (as may be concluded by the other memo indicating that the alert was not activated), the fleet manager may use such information to contact the individual or business party associated with the appointment to fulfill any obligations that may have been missed and/or to reschedule the appointment.

In some instances, one or more of the vehicle occupant(s) and/or a person authorized to view the calendar 98 may respond to the memo/other memo. In one example, responding to the memo/other memo may be accomplished by a vehicle occupant by posting an audio message to the electronic calendar 98. This may include reciting the message as utterances into the microphone 28 inside the vehicle 12, where the utterances are recorded by the recorder 91. The recorded audio message may be transmitted to the host server 94 at which the electronic calendar 98 is resident during a vehicle data upload event, and the host server 94 may upload the voice message to the calendar 98 as a voice post or voice upload.

In another example, responding to the memo/other memo may be accomplished by posting a data message to the electronic calendar 98. The data message may be generated by an authorized person viewing the calendar 98 by typing comments into the appointment cell 100 in response to the memo/other memo. The data message may otherwise be generated by the vehicle occupant(s) from a voice recording of the message (taken by the recorder 91), which is then converted into text via the speech-to-text unit 88, 88'. In instances where the text is converted by the speech-to-text unit 88, the data message is transmitted from the telematics unit 14 to the host server 94 during a vehicle data upload event, and then posted to the calendar 98 as a data post or data upload. In instances where the text is converted by the speech-to-text unit 88', the voice recording is transmitted to the call/data center 24, where it is converted to text by the speech-to-text unit 88'. The data message is then transmitted to the host server 94 from the call/data center 24 and then uploaded to the calendar 98.

In yet another example, responding to the memo/other memo may be accomplished by sending a short message service (SMS) message to another person authorized to access the electronic calendar 98 via the webpage 96, who may post the SMS message to the electronic calendar 98. For instance, the vehicle occupant(s) may recite a response to the memo/other memo into a microphone associated with his/her mobile communications device (e.g., a smart phone), which is converted into text via an internal speech-to-text engine. The text version of the message, in the form of an SMS message, may be submitted to the authorized user, who may upload the message onto the calendar 98 using the webpage 96. The smart phone may contain an application for recording messages and creating text messages from the recorded messages.

In still another example, the vehicle occupant may send an SMS message to the host server 94 using a specific shortcode (e.g., "12345 calendar"), and the host server 94 may autoreply with options to, e.g., view and/or edit the calendar 98, to generate a new alert, etc. Upon authorizing the SMS message sender (via, e.g., verifying the MDN of the device used to submit the SMS message, as well as correctly answering selected challenge question(s)), the host server 94 will upload any responses made by the SMS message sender to the host server's 94 autoreply.

While several examples have been described in detail, it will be apparent to those skilled in the art that the disclosed examples may be modified. Therefore, the foregoing description is to be considered exemplary rather than limiting.

The invention claimed is:

1. A method for updating an electronic calendar in a vehicle, comprising:
   uploading an appointment to the electronic calendar, the appointment including a description of an event, a time block for the event, and a travel time preceding the time block;
   setting an alert in a telematics unit of the vehicle, the alert notifying a vehicle occupant of the appointment, wherein the alert is configured to be activated in response to a trigger that is stored in the telematics unit and is linked to the electronic calendar; and
   at a time subsequent to the time block of the event, the method further comprises one of:
   i) by a processor operatively associated with the telematics unit, the processor executing computer readable code embedded on a tangible, non-transitory computer readable medium, automatically generating and uploading a memo to the electronic calendar indicating that the alert was activated; or
   ii) by a processor operatively associated with the telematics unit, the processor executing computer readable code embedded on a tangible, non-transitory computer readable medium, automatically generating and uploading an other memo to the electronic calendar indicating that the alert was not activated.

2. The method as defined in claim 1 wherein prior to uploading the appointment to the electronic calendar, the method further comprises:
   accessing the electronic calendar via a remotely accessible page; and
   scheduling the appointment by one of selecting or inputting, via the remotely accessible page, the event description, the time block for the event, and the travel time preceding the time block.

3. The method as defined in claim 1 wherein the appointment is uploaded to the electronic calendar as a data upload, and wherein the setting of the alert is accomplished by:
   converting the data upload of the appointment into a voice upload; and
   generating the alert as a voice alert, the voice alert including i) a voice notification of the appointment, and ii) at least the event description portion of the appointment from the voice upload.

4. The method as defined in claim 3, further comprising activating the voice alert in response to the trigger, the activating including outputting the voice alert via a vehicle audio system.

5. The method as defined in claim 1 wherein the alert has not been activated, and wherein the method further comprises:
   at the time subsequent to the time block, disabling the trigger via the telematics unit; and
   automatically uploading the other memo to the electronic calendar indicating that the event did not occur and that the alert is not to be activated.

6. The method as defined in claim 1 wherein the trigger is a geographic boundary constructed around a location at which the event is to occur, and wherein the alert is automatically activated when the vehicle enters the geographic boundary.

7. The method as defined in claim 1, further comprising authorizing a person other than the vehicle occupant to access the electronic calendar via a remotely accessible page, the authorization enabling the person to i) view the appointment, the memo, the other memo, or combinations thereof, ii) edit the appointment, the memo, the other memo, or combinations thereof, or iii) create a new appointment.

8. The method as defined in claim 1, further comprising responding to at least one of the memo or the other memo by at least one of i) posting an audio message to the electronic calendar, ii) posting a data message to the electronic calendar, or iii) sending an SMS message to an other person authorized to access the electronic calendar, and posting, by the other person via a remotely accessible page, the SMS message to the electronic calendar.

9. The method as defined in claim 1, further comprising setting permissions for a user to view or edit pre-event appointment information or post-event appointment information.

10. The method as defined in claim 1 wherein the trigger is associated with a time of the appointment or a position of the vehicle.

11. A method of managing a vehicle fleet, comprising:
   generating an electronic calendar for each vehicle in the fleet, the generating including uploading at least one appointment onto the electronic calendar, wherein the appointment includes an event description, a time block for the event, and a travel time preceding the time block;
   setting an alert in a telematics unit for each vehicle in the fleet, the alert being configured to notify a vehicle occupant of the appointment and configured to be activated in response to a trigger that is stored in the telematics unit and is linked to the electronic calendar;
   at a time subsequent to the time block of the event, one of:
      i) by a processor operatively associated with the telematics unit, the processor executing computer readable code embedded on a tangible, non-transitory computer readable medium, automatically generating and uploading a memo to the electronic calendar indicating that the alert was activated; or
      ii) by a processor operatively associated with the telematics unit, the processor executing computer readable code embedded on a tangible, non-transitory computer readable medium, automatically generating and uploading an other memo to the electronic calendar indicating that the alert was not activated; and
   via the processor, reviewing the memo or the other memo to determine whether each of the vehicles in the fleet conformed to a schedule defined in its respective electronic calendar.

12. The method as defined in claim 11, further comprising updating the electronic calendar by editing the appointment, editing the memo, editing the other memo, creating a new appointment, or combinations thereof.

13. The method as defined in claim 11, further comprising accessing, via a fleet manager using the processor, the electronic calendar to review the appointment, the memo, the other memo, or combinations thereof.

14. A system for updating an electronic calendar in a vehicle, comprising:
   a remotely accessible page configured to enable an authorized person to upload an appointment to the electronic calendar, the appointment including a description of an event, a time block for the event, and a travel time preceding the time block;
   a telematics unit operatively disposed in the vehicle, the telematics unit configured to i) have set therein an alert for notifying a vehicle occupant of the appointment, and ii) activate the alert in response to a trigger; and
   a processor operatively associated with the telematics unit, the processor configured to:
      i) automatically upload a memo onto the electronic calendar indicating that the alert was activated; or
      ii) automatically upload an other memo onto the electronic calendar indicating that the alert was not activated.

15. The system as defined in claim 14 wherein the remotely accessible page is configured to upload the appointment to the electronic calendar as a data upload, and wherein the system further comprises a text-to-speech engine operatively associated with the telematics unit, the text-to-speech engine configured to convert the data upload into a voice upload.

16. The system as defined in claim 15 wherein the telematics unit is configured to generate the alert as a voice alert, and wherein the voice alert includes i) a voice notification of the appointment, and ii) at least the event description of the appointment from the voice upload.

17. The system as defined in claim 16, further comprising an audio component operatively disposed in the vehicle and operatively connected to the telematics unit, the audio component configured to output the voice alert to the vehicle occupant upon activation of the voice alert in response to the trigger.

18. The system as defined in claim 14 wherein the trigger is a geographic boundary constructed around a location at which the event is to occur, and wherein the alert is automatically activated when the vehicle enters the geographic boundary.

19. The system as defined in claim 14, further comprising means for responding to at least one of the memo or the other memo.

\* \* \* \* \*